May 18, 1965 J. C. FAGLIE 3,184,644
POLYPHASE ELECTRORESPONSIVE APPARATUS
Filed April 20, 1959 2 Sheets-Sheet 1

INVENTOR.
JACK C. FAGLIE
BY Carlsen & Hazle
ATTORNEYS

May 18, 1965     J. C. FAGLIE     3,184,644
POLYPHASE ELECTRORESPONSIVE APPARATUS
Filed April 20, 1959     2 Sheets-Sheet 2
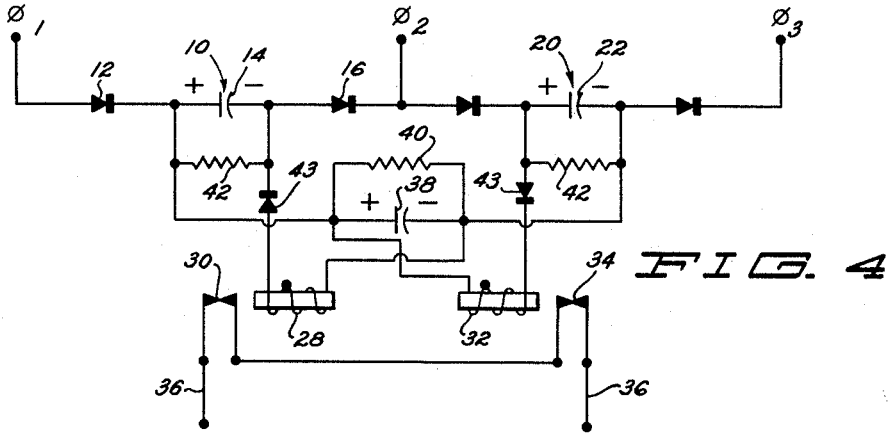
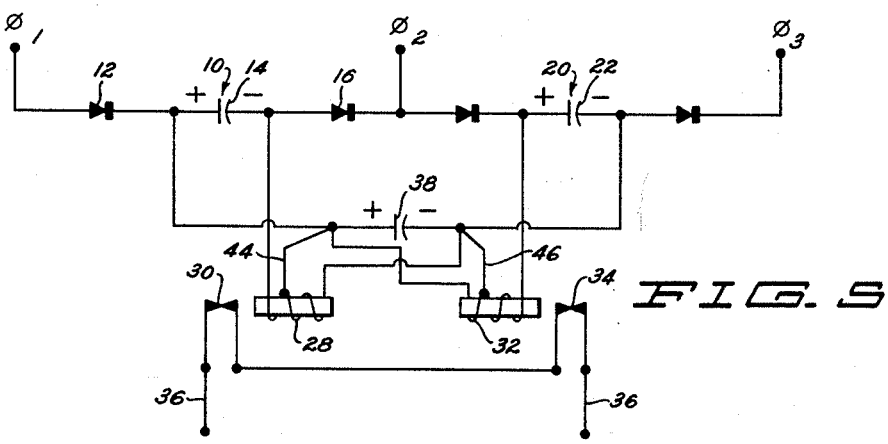
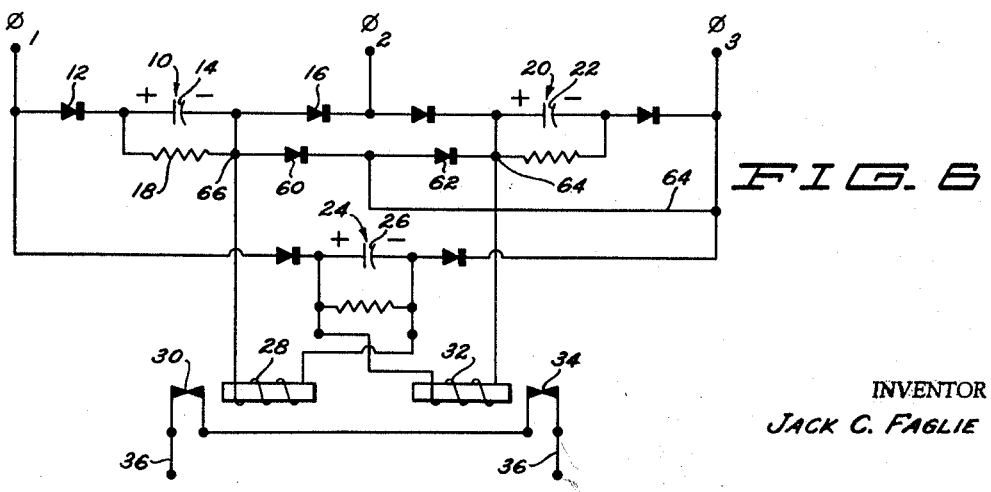
INVENTOR
JACK C. FAGLIE
BY *Carlsen & Carlsen*
ATTORNEYS ID=3,184,644
Patented May 18, 1965

3,184,644
POLYPHASE ELECTRORESPONSIVE APPARATUS
Jack C. Faglie, San Antonio, Tex., assignor, by direct and mesne assignments, to Electric Products Engineering Corp.
Filed Apr. 20, 1959, Ser. No. 807,539
24 Claims. (Cl. 317—46)

This invention relates to apparatus for detecting an unbalance in polyphase electrical networks especially phase failure in electrical systems employing polyphase electric motors.

In a three-phase electrical system failure of one of the phases either by an open circuit, grounding or phase-to-phase short, causes "single-phasing," i.e. effectively only one phase remains operative. Single phasing results in a severe overloading of the windings in a loaded polyphase electric motor which can cause costly damage thereto. A purpose of this invention therefore is to detect "single-phasing" in a three-phase electrical system and upon such detection to provide a suitable electrical indication thereof for disconnecting a motor from the electrical system with a minimum of components.

This invention provides certain improvements over my copending application entitled "Polyphase Electroresponsive Apparatus," Serial Number 786,230, filed January 12, 1959, now Patent No. 3,021,453, granted Feb. 13, 1962. Both inventions detect an unbalance of electrical conditions between two phase conductors in a polyphase system to detect a phase failure, utilize a change in rectified voltages from the phase conductors as a criterion of phase failure and can provide for automatic reconnection of the polyphase load to the electrical source upon restoration of the phase.

Accordingly, it is an object of this invention to provide electrical phase failure detectors comparing like rectified voltages from different phase conductors in a polyphase system wherein a predetermined difference in rectified voltage is indicative of phase unbalances.

These and other more detailed and specific objects will be disclosed in the course of the following specification, reference being had to the accompanying drawing, in which—

FIG. 4 is a further modification of the apparatus shown in FIG. 2.

FIG. 5 is another modification of the apparatus shown in FIG. 2.

FIG. 6 is a modification of the embodiment shown in FIG. 1.

Figure 1:
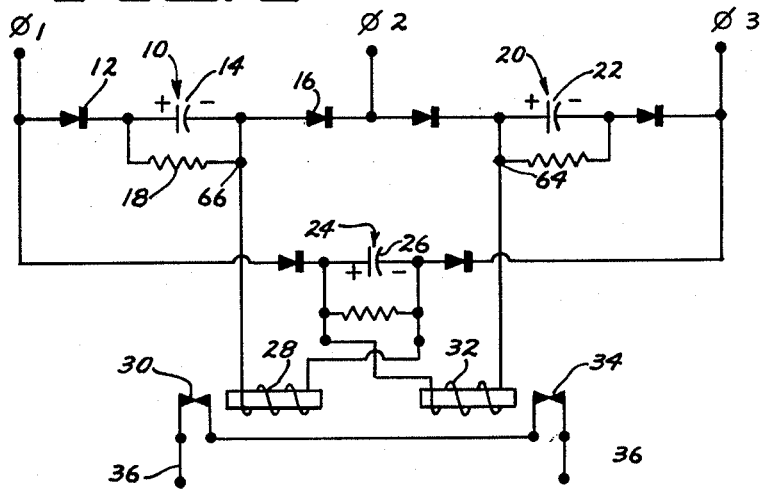
FIG. 1 is a schematic diagram of a first exemplary embodiment of this invention.

With reference now to the drawing like numbers denote like parts in the various schematic diagrams. As used herein the three phase conductors associated with a three-phase electrical system are respectively denoted as $\phi 1$, $\phi 2$ and $\phi 3$. The voltage between two phase conductors is represented by the symbol $\phi 1$–$2$ which the voltage between phase conductors $\phi 1$ and $\phi 2$. In FIG. 1 there is shown a series connected circuit 10 having a first rectifier 12 providing a half-wave rectified positive voltage to a filter capacitor 14 from phase conductor $\phi 1$ with the positive voltage side of capacitor 14 being designated as the positive terminal thereof. A second rectifier 16 provides a negative voltage to the other or negative terminal of capacitor 14 from phase conductor $\phi 2$. For improved operation a resistive load 18 is connected across capacitor 14. Under normal electrical conditions in the electrical system (not shown) rectifiers 12 and 16 through load 18 provide predetermined positive and negative half-wave rectified voltages respectively on the capacitor 14 positive and negative terminals. Likewise in series connected circuit 20, including a filter capacitor 22, positive and negative voltages are provided in an identical manner and are respectively indicative of the electrical conditions on phase conductors $\phi 2$ and $\phi 3$. A third series connected circuit 24, including a filter capacitor 26, is provided between the $\phi 1$ and $\phi 3$ phase conductors thereby providing rectified filtered voltages from all three phase conductors respectively indicative of their electrical conditions.

Each of the series connected circuits 10, 20, and 24, operate independently of the other and provide electrical indication of only the two phase conductors connected thereto. For example, in circuit 10 the voltage on the capacitor 14 positive terminal always becomes more negative whenever $\phi 1$ conductor is involved with a single-phasing electrical fault. When said conductor is grounded, rectifier 12 clamps the positive terminal to ground preference potential providing a great change in the terminal voltage. When the $\phi 1$ conductor is opened voltage is maintained thereon at a reduced voltage magnitude through the usual star or delta connected three-phase loads. The sensitivity of the voltage responsive relays 28 and 32 are preferably adjusted to the magnitude of the voltage change caused by the just described type of opened conductor fault. This latter voltage change across relays 28 and 32 may be greater than in the prior above referred to invention. When similar faults occur on the $\phi 2$ conductor there is a corresponding voltage change on capacitor 14 negative terminal with the direction of the voltage change being to a positive voltage rather than to a negative voltage.

A phase-to-phase short between the conductors coupled to the series connected circuit 10 provide a detectable voltage change on both the positive and negative filter capacitor 14 terminals. The $\phi 1$ and $\phi 2$ conductors are then effectively one conductor having an RMS voltage to ground equal to the vector sum of the two phase voltages normally found thereon less any increased line drop. With a substantial change in R.M.S. voltage there is a corresponding detectable change in the half-wave rectified voltage on both the positive and negative terminals of the capacitor 14.

A phase-to-phase short between a conductor connected to circuit 10 and a second phase conductor not connected thereto provides a similar voltage change on the two shorted conductors with the change being applied only to the capacitor 14 terminal connected to the faulty line through a rectifier. For example, when phase conductors $\phi 1$ and $\phi 2$ are shorted together the voltage on capacitor 14 positive terminal only will change. In any event voltage change indication of the fault occurs on the capacitor terminal connected via a rectifier to the faulty conductor.

The other two series connected circuits operate in the manner just described for circuit 10. Utilization of the described voltage changes on the filter capacitors is preferably provided by connecting a voltage sensitive relay 28, having normally closed contacts 30, between the negative voltage terminals of two series connected circuits such as circuits 10 and 24 and connecting a second voltage sensitive relay 32 having normally closed contacts 34 between positive voltage terminals of another two series connected circuits such as circuits 20 and 24. These relays preferably have high impedance coils so the voltage changes in the respective series connected circuits will not be substantially altered by the relay coil interconnections. The relay sensitivity is adjusted for the minimum expected voltage change in any one of the series connected circuits caused by an electrical fault.

From inspecting FIG. 1 it is seen that at least one side of each of the coils of relays 28 and 32 is connected to a capacitor terminal having a rectified voltage derived from a phase conductor such that each of the phase conductors provides at least one rectified voltage to one terminal of a relay coil. An electrical fault, such as single phasing, in any one or more conductors results in the energization of either or both of relays 28 and 32 to open their respective normally closed contacts 30 and 34. The said contacts are series connected between control terminals 36 with an opened circuit therebetween being indicative of a fault. Terminals 36 may be connected to a polyphase load controller such as shown in FIGS. 5 and 6 of my co-pending application, supra.

It is preferred that series current-limiting resistors (not shown) be provided on the capacitor side of each of the rectifiers in any of the various embodiments of this invention. That is, a low impedance resistance is preferably inserted, for example, between the cathode of rectifier 12 and the positive terminal of capacitor 14 to limit the surge current of the filter capacitor 14 for protecting rectifier 12 from burn out.

When the $\phi 1$ conductor is involved in a fault the capacitor 14 positive terminal has a reduced positive voltage thereon thereby reducing the voltage drops across both series connected circuits 10 and 24 while the voltage across circuit 20 remains substantially constant. As a result relay 28 still has no voltage thereacross while relay 32 is energized by the voltage difference between the capacitor 22 positive terminal and the capacitor 26 positive terminal. The same action is true for a phase failure involving the $\phi 3$ conductor, i.e. relay 28 is energized to indicate the fault.

When the $\phi 2$ conductor fails the voltage across circuit 24 remains constant while the voltage across both circuits 10 and 20 drop, thereby causing both relays 28 and 32 to indicate the $\phi 2$ conductor faults.

Figure 2:
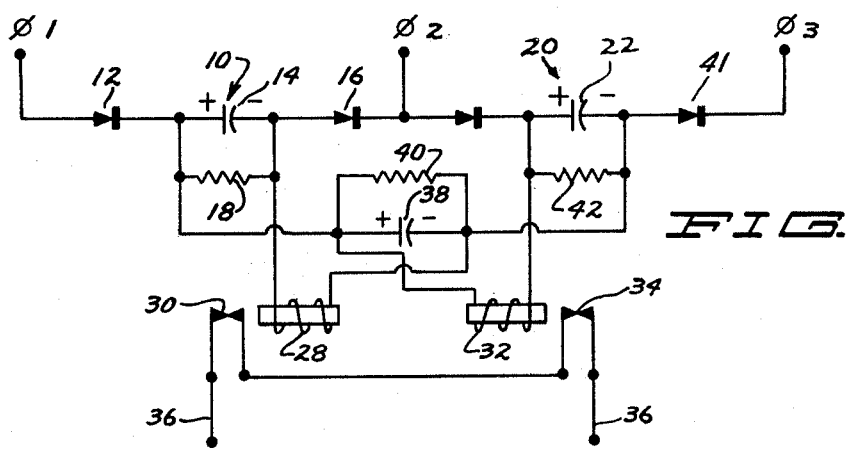
FIG. 2 is a schematic diagram of a second and preferred embodiment of this invention.

A modification of FIG. 1 is shown on FIG. 2 wherein capacitor 38 and resistive load 40 are substituted for circuit 24 by connecting the capacitor-resistance 38–40 between the capacitor 14 positive terminal (rectified voltage from $\phi 1$) and the capacitor 22 negative terminal (rectified voltage from $\phi 3$). In both embodiments at least one rectified voltage is provided by each of the phases of the electrical system. In FIG. 2 it is seen that rectifiers 12 and 41 respectively provide rectified voltages from $\phi 1$ and $\phi 3$ conductors to a pair of capacitors, respectively 14–38 and 22–38. In all other respects the circuits operate identically, except that the latter circuit is more sensitive to voltage changes between the phases because of elimination of the rectifier resistance between the positive potentials from $\phi 1$ and the negative potentials derived from $\phi 3$.

In summary the operation of the FIG. 1 and FIG. 2 embodiments is that when the $\phi 1$ conductor is involved in a single-phasing fault relay 32 is energized to indicate the fault, when the $\phi 2$ conductor is involved both the relays 28 and 32 indicate the fault and when the $\phi 3$ conductor is involved relay 28 indicates the fault.

Another modification of this invention is provided by eliminating capacitor 38 from the circuit of FIG. 2 and substituting normally open contacts for the relay contacts 30 and 34 of the respective relays. Without capacitor 38 the rectified voltage effective value across resistance 40 decreases, while the voltages across resistances 18 and 42 remain the same.

Therefore the voltage drop from the capacitor 10 positive terminal across resistance 18 is greater than the voltage drop across resistance 40, resulting in a net voltage difference across the relay 28 coil sufficient to energize same for closing the substituted normally open contacts (not shown). The same is true for resistance 40 and 42 causing relay 32 to energize. During a fault condition on anyone of the three conductors the voltage across resistance 40 changes at a different rate than the voltage across the resistances 18 and 42 which still are in parallel circuit with filter capacitors 14 and 22.

Actually when $\phi 1$ phase conductor fails the rectified voltage across resistance 18 and thus capacitor 14 changes to the same value as the voltage across resistance 40. This is true of all types of single phasing faults, and thus relay 28 is de-energized opening the normally open contacts (not shown) to indicate a fault on $\phi 1$ conductor. The same is true for the $\phi 3$ conductor. When $\phi 2$ conductor fails, both relays are deenergized in the manner described for the $\phi 1$ and $\phi 3$ conductor failures. When a more serious fault occurs, the voltage changes across resistances 18 and 42 may become greater so as to make the voltages thereacross greater than across resistance 40 and cause a reversed voltage across relays 28 and 32 and thereby re-energize same.

A further modification of the latter described circuit is to provide two blocking diodes 43 as shown in FIG. 4. The purpose of the blocking diodes or rectifiers 43 is to block current flow through the relays 28 and 32 in the event the fault causes a sufficiently large voltage change across either of resistances 18 or 42 to cause the voltage on the capacitor 14 and 22 negative terminals to respectively go more positive and negative than the voltage on the respective ends of resistance 40. This prevents energization of the relays even with a reversed voltage provided thereacross when a serious fault occurs, thereby insuring reliable fault indication.

Another variation of this invention is provided by eliminating all the resistive loads 18, 40, and 42, and center-tapping the two relay coils and connecting the centertaps through conductors 44 and 46 in FIG. 5 to a capacitor terminal of opposing voltage polarity from the coil end connections. In this way the resistance of the relay coils provide the preferred resistive loading in the series circuit. During normal electrical conditions the currents from the outer ends of the centertapped relay coils to the center tap will cancel each other's flux. For example, in FIG. 2 the currents through coil 32 from capacitor 22 positive terminal and from capacitor 38 positive terminal to the capacitor 38 negative terminal are equal in magnitude and are flowing in opposing directions in coil 32 and thereby the total flux is zero. Should an unbalance occur resulting in a substantial change in voltage on one phase conductor, the respective current magnitudes would correspondingly change to provide a net flux to actuate the relay for providing fault indication.

Figure 3:
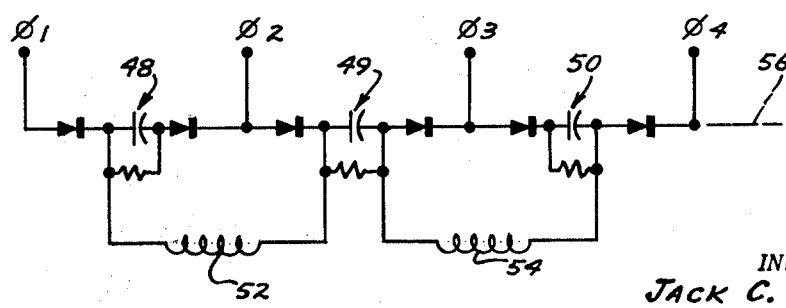
FIG. 3 is a schematic of a modified FIG. 2 circuit adapted for an N-phase electrical system.

Extension of the present invention as shown in FIG. 2 to include N-phase systems, where N represents any arbitrary whole number, is simply provided by inserting a series connected circuit, such as 10, between adjacent phase conductors such that for N-phase conductors there will be N—1 series connected circuits. There is provided a positive and negative rectified voltage from each phase conductor in at least one series connected circuit. Detection of a phase fault is provided by connecting a voltage responsive relay such as relay 28 between like rectified voltages of two different series connected circuits. As seen in block diagram form in FIG. 3 there are four phase conductors $\phi 1$ through $\phi 4$ each connected to series connected circuits 48 through 50 having voltage responsive relays 52 and 54 electrically connected between like rectified voltages derived from different phase conductors. Phase failure detection of a five-phase system simply requires the addition of a single series connected circuit as indicated by dotted line 56 and a connection of a relay between positive voltage point 58 in circuit 50 to a like point in circuit 56. Similarly higher order polyphase systems may also be provided with phase failure detection with a minimum of components. The response of this circuit is identical to that of the FIG. 2 circuit.

Full wave rectification can be utilized with the present invention by providing a conventional bridge type rectification circuit as is formed by adding rectifiers 60 and 62 between circuit junctions 64 and 66 to the embodiment in FIG. 1 as shown in FIG. 6 and connecting the junction of the two added rectifiers via a conductor indicated by line 68 to φ3 conductor. It is seen the described connections provide a full-wave rectified negative voltage on the capacitor 14 negative terminal and a full-wave rectified positive voltage on the capacitor 22 positive terminal. It is understood that all three conductors, φ1, φ2, and φ3, should have such connections to provide the desired full-wave operation.

Thus there are shown several embodiments wherein the various objects and advantages of the present invention have been successfully achieved. It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A three phase electroresponsive system comprising three phase conductors, a plurality of rectifying means respectively coupled to the three conductors, three impedances respectively electrically coupling the rectifiers, means for providing a load between each of said phase conductors, a filter capacitor across one of said impedances, the rectifying means providing voltages of like and opposite polarities to said impedances, two voltage responsive relays respectively connected between two impedances having the like polarity voltages thereon and two impedances having the opposite voltage polarities thereon wherein each of said conductors provides at least one rectified voltage to said relays.

2. In a phase-failure detector for three phase energy transmission system, the combination comprising; three input terminals; circuit means, including first capacitive impedance means intermediate a pair of asymmetrical current conducting devices, interconnecting a pair of said input terminals; circuit means, including second capacitive impedance means intermediate a pair of asymmetrical current conducting devices, connecting one of last named terminals to another of said input terminals; and means, responsive to a difference in potential between like corresponding ends of said first and second impedance means, interconnecting like corresponding ends of said first and second impedance means.

3. In a fault detector for polyelectrical systems, the combination comprising; first, second and third input terminals adapted for connection to a three phase distribution system; circuit means, including asymmetrical current conducting means and capacitive impedance means interconnecting said first and second terminals, said asymmetrical current conducting means being adapted to conduct current in a first direction and with respect to said second terminal; circuit means, including asymmetrical current conducting means and capacitive impedance means interconnecting said second and third terminals, said asymmetrical current conducting means being adapted to conduct current in a second direction with respect to second terminal; and means interconnecting like corresponding portions of said impedance means and responsive to difference in potential therebetween for detecting and indicating the presence of faults in said distribution system.

4. The apparatus of claim 3 in which said detecting means is comprised of a pair of coil windings of substantial impedance.

5. The apparatus or claim 3 in which the coil windings are each provided with a center tap terminal and the center tap terminals of each of the coil windings are connected to respective corresponding ends of the other coil winding.

6. A fault detector comprising; first, second and third input terminals adapted for connection to a three phase source of alternating current energy; circuit means, inculding a pair of asymmetrical current conducting devices and an impedance means including first and second terminals interposed therebetween, interconnecting said first and second terminals; circuit means, including a pair of asymmetrical current conducting devices having an impedance means including two terminals interposed therebetween, interconnecting said second and third terminals; said asymmetrical current conducting devices in each of said circuit means being polarized so that current flow therethrough results in like terminals of said impedance means being of like polarity; intergrating means associated with at least one of said impedance means; a pair of output means including coil windings therefor; circuit means including an asymmetrical current conducting device connecting each of the coils on said output means intermediate corresponding like terminals on said impedance means.

7. A polyphase electroresponsive system comprising; first and second and third input terminals; circuit means including first asymmetircal current conducting means and first integrating means having first and second terminals, interconnecting said first and second input terminals; circuit means including second asymmetrical current conducting means and second integrating means having first and second terminals, interconnecting said second and third input terminals; first and second means responsive to a difference in voltage thereacross for energization thereof; circuit means connecting said first means intermediate the first terminal on said first impedance means and the second terminal on said second integrating means; and circuit means connecting said second means intermediate the second terminal on said first integrating means and the first terminal on said second integrating means.

8. The apparatus of claim 6 in which said integrating means is a capacitor.

9. The apparatus of claim 6 in which each of said coil windings has intermediate tap and said intermediate taps are each connected to the asymmetrical current conducting device in the circuit means for the other of said coil windings.

10. A phase failure detector for a three phase energy transmission system comprising in combination; three input terminals; three impedance means exhibiting asymmetrical current conducting characteristics whereby a unidirectional potential appears thereacross when said impedance means are energized with an alternating current; circuit means connecting said impedance means intermediate said input terminals so that each impedance means may be energized from two of said three input terminals and each of said three terminals is connected to two of said impedance means; first and second current responsive means; circuit means connecting said first current responsive means intermediate a pair of said impedance means so that like polarities of unidirectional potential of a first polarity are applied thereacross; and circuit means connecting said second current responsive means intermediate one of said pair of impedance means and the other of said impedance means so that like polarities of unidirectional potential of a second polarity are applied thereacross, said current responsive means being operable to indicate the location of a fault in a three phase energy transmission system whereby energization of one or the other of said current responsive means will indicate a fault in one or the other of two phases and energization of both of said current responsive means will indicate a fault in a third phase.

11. The apparatus of claim 10 in which the impedance means include means for integrating the unidirectional voltage.

12. The apparatus of claim 11 in which the integrating means is a capacitor.

13. The apparatus of claim 11 in which the current responsive means are each comprised of a coil winding and driving means operable to actuate a switch in response to energization of the coil winding.

14. A polyphase electroresponsive system comprising in combination; first, second and third input terminals;

first, second and third circuit means connected intermediate said terminals, each of said circuit means being responsive to current flow therethrough to provide a unidirectional potential thereacross; first and second current responsive means; means connecting said first current responsive means intermediate said first and second circuit means so that potential of one polarity is applied thereacross; and means connecting said second current responsive means intermediate said second and third circuit means so that potential of the opposite polarity is applied thereacross whereby energization of said first current responsive means is indicative of a fault associated with one of said input terminals, energization of said second current responsive means is indicative of a fault associated with another of said input terminals and simultaneous energization of both of said current responsive means is indicative of a fault associated with still another of said input terminals.

15. The apparatus of claim 14 in which the circuit means include filtering means.

16. The apparatus of claim 14 in which the circuit means include capacitor means.

17. A polyphase electroresponsive system comprising in combination; a plurality (N) of input terminals for connection to an (N) phase electrical system; a like plurality (N) of impedance means connected in series to provide N+1 intermediate terminals; at least N+1 asymmetrical current conducting devices connected intermediate the intermediate terminals and said input terminals so that adjacent impedances are energized with unidirectional potentials of opposite polarity whereby alternate pairs of intermediate terminals are of like polarity; and N−1 current responsive indicating means connected between each of said pair of intermediate terminals so that energization of one or more of said indicating means is indicative of a fault in said system and the state of energization of all of said indicating means is indicative of the phase in which a fault occurs.

18. The apparatus of claim 17 in which the indicating means include a coil winding on a relay.

19. The apparatus of claim 17 in which the impedance means include means for integrating the unidirectional potential thereacross.

20. Fault responsive apparatus for a three phase electrical system comprising in combination; first, second and third input terminals, each connected to one phase of a three phase electrical system; first, second and third impedance means, said second impedance means being connected intermediate said first and third impedance means; a plurality of asymmetrical current conducting devices connecting one end of said first and third impedance means to one of said input terminals and said second impedance means intermediate the other input terminals so that the ends of said first and third impedance means and said second impedance means are of opposite polarity; first current responsive indicating means connected intermediate the ends of like polarity of said first and second impedance means; and second current responsive indicating means connected intermediate the ends of like polarity of said second and third impedance means whereby said first and second indicating means are energized in a predetermined manner dependent on the phase in which a fault occurs.

21. The apparatus of claim 20 in which the indicating means are relays having switching means connected to a means for de-energizing a load means.

22. The apparatus of claim 20 in which the impedance means include means for integrating the unidirectional potential appearing thereacross.

23. A three phase electroresponsive system comprising three phase conductors, a plurality of rectifying means respectively coupled to the three conductors; three impedances respectively electrically coupling the rectifying means for providing a load between each of said phase conductors, said rectifiers providing voltages of like and opposite polarities across said impedances, two voltage responsive relays respectively connected between two impedances having one like polarity and two impedances having opposite like polarity wherein each of said conductors is providing at least one rectified voltage to said relays.

24. The apparatus of claim 23 in which filter means are connected to each of the impedance means.

References Cited by the Examiner

UNITED STATES PATENTS

| 1,888,718 | 11/32 | Friedlander | 317—27 |
| 2,095,754 | 10/37 | Vesconte | 317—27 |
| 2,242,950 | 5/41 | Harder | 317—27 |
| 2,381,282 | 8/45 | Harder | 317—52 |
| 2,393,043 | 1/46 | Harder | 317—52 |
| 2,454,163 | 11/48 | Harder | 317—52 |
| 3,001,100 | 9/61 | Schuh | 317—27 |

SAMUEL BERNSTEIN, *Primary Examiner.*